US005774527A

United States Patent [19]

Handelman et al.

[11] Patent Number: 5,774,527
[45] Date of Patent: *Jun. 30, 1998

[54] INTEGRATED TELEPHONE AND CABLE COMMUNICATION NETWORKS

[75] Inventors: Doron Handelman, Givataim; Sanford T. Colb, Rehovot, both of Israel

[73] Assignee: News Datacom Ltd., London, England

[ * ] Notice: The term of this patent shall not extend beyond the expiration date of Pat. No. 5,414,773.

[21] Appl. No.: 302,607

[22] Filed: Sep. 8, 1994

[30] Foreign Application Priority Data

Jan. 21, 1994 [IL] Israel ........................................ 108402

[51] Int. Cl.$^6$ ............................................... H04M 11/00
[52] U.S. Cl. ................................ 379/93.07; 379/93.08; 379/93.17; 379/93.11; 379/90.01; 379/100.12; 379/100.17; 379/106.03; 455/6.3; 348/6; 348/10
[58] Field of Search ................................ 348/14, 13, 12, 348/15, 16, 17, 18, 19, 6, 10; 455/3.1, 4.1, 4.2, 5.1, 6.1, 6.2, 6.3; 379/90, 93, 94, 96, 110, 90.01, 93.05, 93.07, 93.09, 93.11, 93.14, 93.15, 93.17, 100.12, 100.17, 106.03

[56] References Cited

U.S. PATENT DOCUMENTS

| | | | |
|---|---|---|---|
| 4,361,730 | 11/1982 | Barber et al. | 379/90 |
| 4,757,497 | 7/1988 | Beierle et al. | 370/89 |
| 5,027,426 | 6/1991 | Chiocca, Jr. | 455/5 |
| 5,130,792 | 7/1992 | Tindell et al. | 358/85 |
| 5,278,889 | 1/1994 | Papahicolaou et al. | 348/14 |
| 5,329,308 | 7/1994 | Binns et al. | 455/6.3 |
| 5,343,240 | 8/1994 | Yu | 455/6.3 |
| 5,365,264 | 11/1994 | Inoue et al. | 348/12 |
| 5,374,951 | 12/1994 | Welsh | 455/6.3 |
| 5,379,421 | 1/1995 | Palazzi, III et al. | 379/105 |
| 5,414,773 | 5/1995 | Handelman | 455/6.3 |
| 5,421,030 | 5/1995 | Baran | 455/6.3 |
| 5,440,335 | 8/1995 | Beveridge | 455/6.3 |
| 5,488,413 | 1/1996 | Elder et al. | 455/6.3 |

FOREIGN PATENT DOCUMENTS

WO/87/04884  8/1997  WIPO ........................ H04M 11/08

OTHER PUBLICATIONS

Ernest K. Smith, Pilot Two–Way CATV Systems, IEEE Transactions on Communications, vol. COM.23, No. 1 Jan. 1975, pp. 111–119.

David G. Willard, A Time Division Multiple Access System for Digital Communication, Computer Design, Jun. 1974, pp. 79–83.

Hiroshi Sato, Two–User Communication Channels, IEEE Transactions on Information Theory, vol. It–23, No. 3, May 1977, pp. 295–304.

Robert J. Potter, Electronic Mail, Science, vol. 195, Mar. 1977, pp. 1160–1167.

Dietrick Becker, et al., Classification and Assessment of Telecommunication Services in Broad–Band Networks, IEEE, Transations on Communications, vol. COM–23, No. 1 Jan. 1975, pp. 63–69.

(List continued on next page.)

*Primary Examiner*—Stella Woo
*Attorney, Agent, or Firm*—Limbach & Limbach LLP

[57] ABSTRACT

An integrated telephone and cable network comprising a telephone network including at least one directing center and first network cabling connecting a directing center to a multiplicity of subscribers, a cable network including at least one headend and second network cabling connecting a headend to the multiplicity of subscribers, a subscriber telephone facility including first subscriber cabling and at least one telephone appliance, a subscriber cable facility including second subscriber cabling and at least one cable appliance, and a subscriber interface unit interfacing between the subscriber telephone facility and the subscriber cable facility and the first and second network cabling whereby communication is enabled between the first subscriber cabling and the second network cabling and between the second subscriber cabling and the first network cabling.

36 Claims, 8 Drawing Sheets

OTHER PUBLICATIONS

John J. Coyne, An Integrated Broad–Band Distribution System Using Demand Assignment, IEEE Transactions on Communications, vol. COM–23, No. 2, Jan. 1975, pp. 55–62.

A.G. Hare, et al., Multipurpose Wide–Band Local Distribution—Proposals for an Integrated System, IEEE Transactions on Communications, vol. COM–23, No. 2, Jan. 1975, pp. 42–48.

Paul Baran, Broad–Band Interative Communication Services to the Home: Part 1: Potential Market Demand, IEEE, Transactions on Communications, vol. COM–23, No. 1, Jan. 1975, pp. 5–15.

Koji Maeda, Individualized Still–Picture Communication on a Two–Way Broad–Band CATV Ssystem, IEEE Transactions on Communications vol. COM–23, No. 1, Jan. 1975, pp. 73–77.

Paul Baran, Broad–Band Interactive Communication Services to the Home—Part II: Impasse, IEEE Transactions on Communications vol. COM–23, No. 1, Jan. 1975, pp. 178–184.

Jeffery R. Miller, et al. Method For Supplying Interactive Services on Broad–Band Communication Networks, IEEE Transactions on Communications vol. COM–23, No. 1 Jan. 1975, pp. 73–77.

Jan L. Bordewijk, on the Marriage of Telephone and Television, IEEE, Transactions on Communication, vol. COM–23, No. 1, Jan. 1975, pp. 70–73.

B.R. Clouston, "Laws of Convergence: Impacting cable's future," *International Cable*, Mar. 1933, pp. 42–45.

S. Wittering, "Cable telecom UK," *International Cable*, Mar. 1993, pp. 46–51.

A.L. Kaza, "Cable/telephony possibilities," *International Cable*, Mar. 1993, pp. 52 and 56.

"Telecommunications," *IEEE Spectrum*, Jan. 1993, pp. 38–41.

"CEPT1 Line Interface," *EXAR*, XR–T7288, pp. 1–21.

INTEGRATED TELEPHONE AND CABLE COMMUNICATION NETWORKS

FIELD OF THE INVENTION

The present invention relates to telecommunications generally and more particularly to combination telephone and cable networks.

BACKGROUND OF THE INVENTION

In recent years, integration of cable television and telephone networks has shifted from being a theoretical possibility to being a commercial reality. Business entities now exist which operate both telephone and cable networks.

Various suggestions for integration of cable television and telephone networks appear in the literature. Examples of relevant articles are listed hereinbelow:

Laws of Convergence: Impacting cable's future, International Cable, March 1993; pp. 42–45;

Cable telecom UK, International Cable, March 1993; pp. 46–51;

Cable/telephony possibilities, International Cable, March 1993; pp. 52 ff.

Telecommunications, IEEE Spectrum, January 1993; pp. 38–41.

U.S. Pat. No. 5,027,426 to Chiocca, Jr. describes a signal coupling apparatus for combining CATV and telephone signals onto a single cable for transmission to an impulse pay-per-view converter device.

SUMMARY OF THE INVENTION

The present invention seeks to provide an integrated cable and telephone network and associated apparatus which greatly expands flexibility and utilization efficiency of existing infrastructure.

There is thus provided in accordance with a preferred embodiment of the present invention an integrated telephone and cable network including:

- a telephone network including at least one directing center and first network cabling connecting a directing center to a multiplicity of subscribers;
- a cable network including at least one headend and second network cabling connecting a headend to the multiplicity of subscribers;
- a subscriber telephone facility including first subscriber cabling and at least one telephone appliance;
- a subscriber cable facility including second subscriber cabling and at least one cable appliance; and
- a subscriber interface unit interfacing between the subscriber telephone facility and the subscriber cable facility and the first and second network cabling whereby communication is enabled between the first subscriber cabling and the second network cabling and between the second subscriber cabling and the first network cabling.

There is also provided in accordance with a preferred embodiment of the present invention a subscriber interface unit for interfacing between a subscriber telephone facility and a subscriber cable facility on one side and first and second network cabling connected respectively to a telephone network and a cable network on the other hand and including apparatus for providing communication between the subscriber telephone facility and the second network cabling and between the subscriber cable facility and the first network cabling.

In accordance with a preferred embodiment of the present invention the subscriber interface unit includes directing apparatus for directing information between the first subscriber cabling on one side and either of the first and second network cabling on the other side.

Further in accordance with a preferred embodiment of the present invention the subscriber interface unit includes directing apparatus for directing information between the second subscriber cabling on one side and either of the first and second network cabling on the other side.

Additionally in accordance with a preferred embodiment of the present invention the subscriber interface unit includes directing apparatus for directing information between the first network cabling on one side and either of the first and second subscriber facilities on the other side.

Still further in accordance with a preferred embodiment of the present invention the subscriber interface unit includes directing apparatus for directing information between the second network cabling on one side and either of the first and second subscriber facilities on the other side.

Additionally in accordance with a preferred embodiment of the present invention the subscriber interface unit includes apparatus for automatic load directing between the first and second network cabling.

Further in accordance with a preferred embodiment of the present invention, the subscriber interface unit includes reformatting apparatus for changing information from a cable network format to a telephone network format.

Additionally in accordance with a preferred embodiment of the present invention, the subscriber interface unit includes reformatting apparatus for changing information from a telephone network format to a cable network format.

In an analog signal environment, the reformatting apparatus comprises demodulation apparatus. In a digital signal environment the reformatting apparatus comprises a digital cable transmitter.

In accordance with a preferred embodiment of the invention at least one of the first subscriber cabling and the first network cabling comprises twisted pair cabling.

In accordance with a preferred embodiment of the invention at least one of the second subscriber cabling and the second network cabling comprises coaxial cabling.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
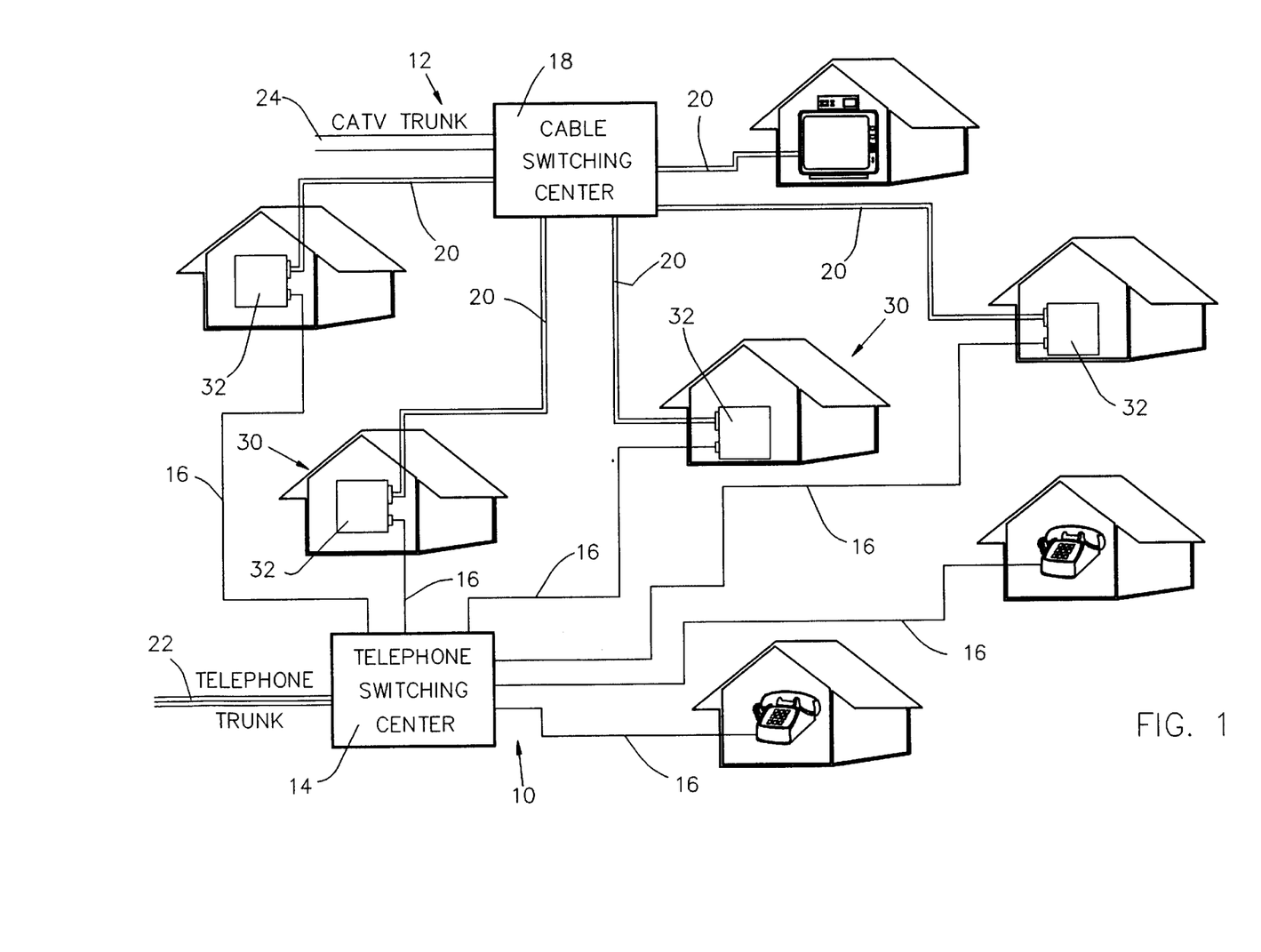
FIG. 1 is a generalized block diagram illustration of an integrated telephone and cable network system constructed and operative in accordance with a preferred embodiment of the present invention.

Reference is now made to FIG. 1 which illustrates an integrated telephone and cable network constructed and operative in accordance with a preferred embodiment of the present invention and including a telephone network, indicated generally by reference numeral 10 and a cable network, indicated generally by reference numeral 12.

The telephone network 10 preferably includes at least one directing center 14 and first network cabling 16 connecting the directing center to a multiplicity of subscribers. The cable network preferably includes at least one headend or cable directing center 18, both referred to throughout as a cable directing center, and second network cabling 20 connecting the cable directing center to a multiplicity of subscribers.

Both the telephone network and the cable network may be connected by communication links 22 and 24 respectively to remote networks, both cable and telephone. The telephone network cabling may be twisted pair, fiber optic or any other suitable conventional cabling and the cable network cabling may be coaxial, fiber optic or any other suitable conventional cabling.

The present invention concerns subscribers, here designated by reference numeral 30, who are connected to both the conventional telephone and cable networks. Each such subscriber is equipped with a subscriber telephone facility including first subscriber cabling and at least one telephone appliance and with a subscriber cable facility including second subscriber cabling and at least one cable appliance.

In accordance with a preferred embodiment of the present invention, there is provided at each subscriber location a subscriber interface unit 32 interfacing between the subscriber telephone facility and the subscriber cable facility thus enabling communication between a telephone appliance and a cable appliance at the subscriber location via either or both the first and second subscriber cabling and between a conventional telephone network and a conventional cable network and either or both of a telephone appliance and a cable appliance in the subscriber location.

The sections of the subscriber cabling, whether part of the telephone network or part of the cable network, which extend outside the subscriber location and are linked to the subscriber interface unit 32 are referred to hereinafter as external cabling or external links, whereas the sections of the subscriber cabling, whether part of the telephone network or part of the cable network, which extend throughout the subscriber location and are linked to the subscriber interface unit 32 are referred to hereinafter as internal cabling or internal links.

In accordance with a preferred embodiment of the present invention external links are employed to convey communication signals to and from the subscriber location via subscriber interface unit 32 whereas internal links are employed to convey communication signals in the subscriber location to different appliances, between appliances and from appliances to remote communication networks via subscriber interface unit 32.

Figure 2:
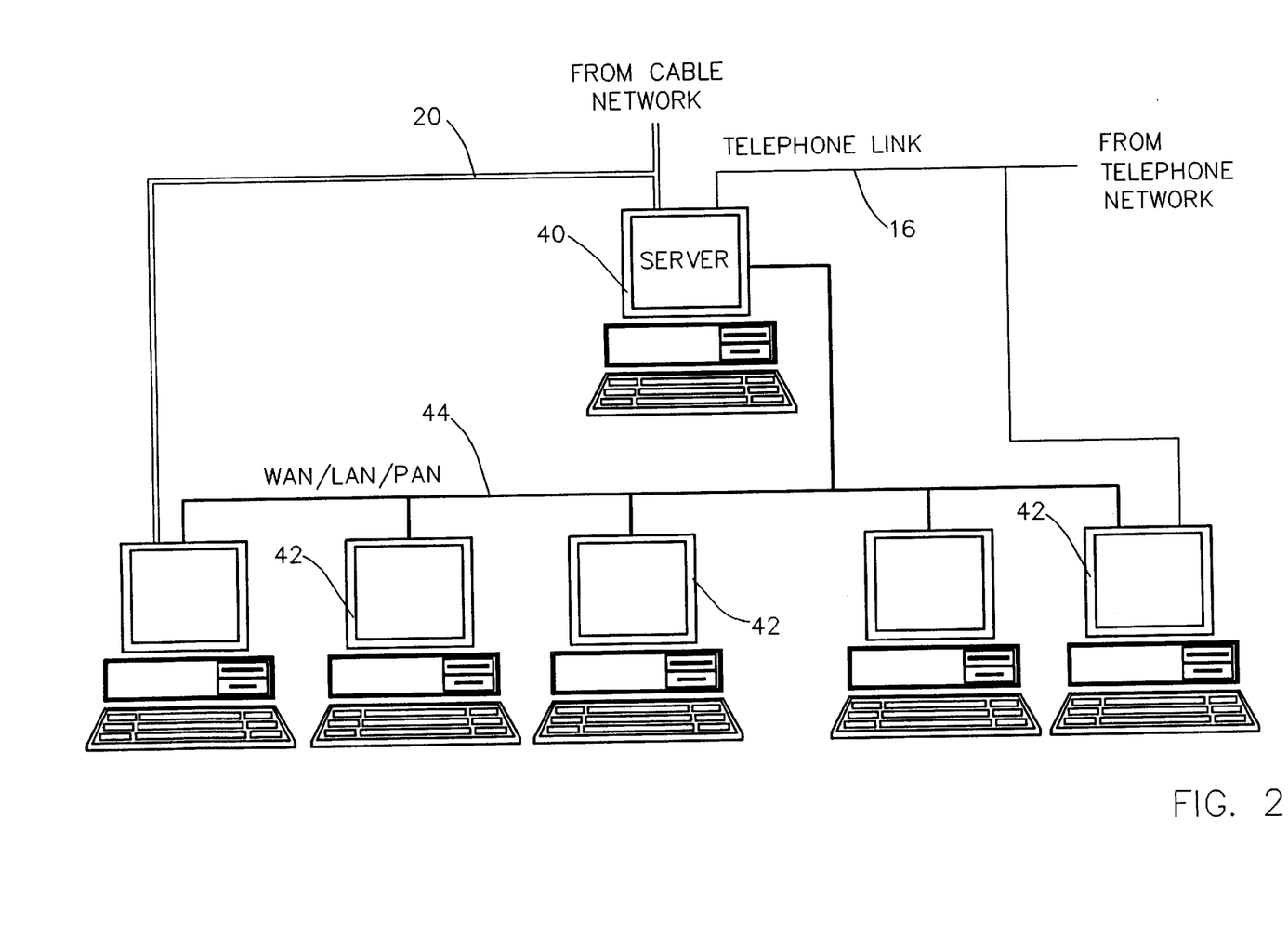
FIG. 2 is a generalized block diagram illustration of a portion of the integrated telephone and cable network system of FIG. 1 in accordance with one preferred embodiment of the invention.

The subscriber interface unit 32 may be operative in various operating environments at the subscriber location. One such environment is illustrated generally in FIG. 2, wherein the subscriber interface unit is embodied in a server 40 which is coupled to the first and second network cabling 16 and 20 and is also connected to a plurality of computers or terminals 42 via a local area network 44. It is noted that one or more of the plurality of computers or terminals 42 may also be connected directly to either or both of the first and second network cabling 16 and 20 via suitable modems or other interfaces (not shown) or via extension cards which are added to the computers or terminals 42 each of which includes a subscriber interface unit 32. It is to be appreciated that network 44 may also be a personal area network or a wide area network.

Figure 3:
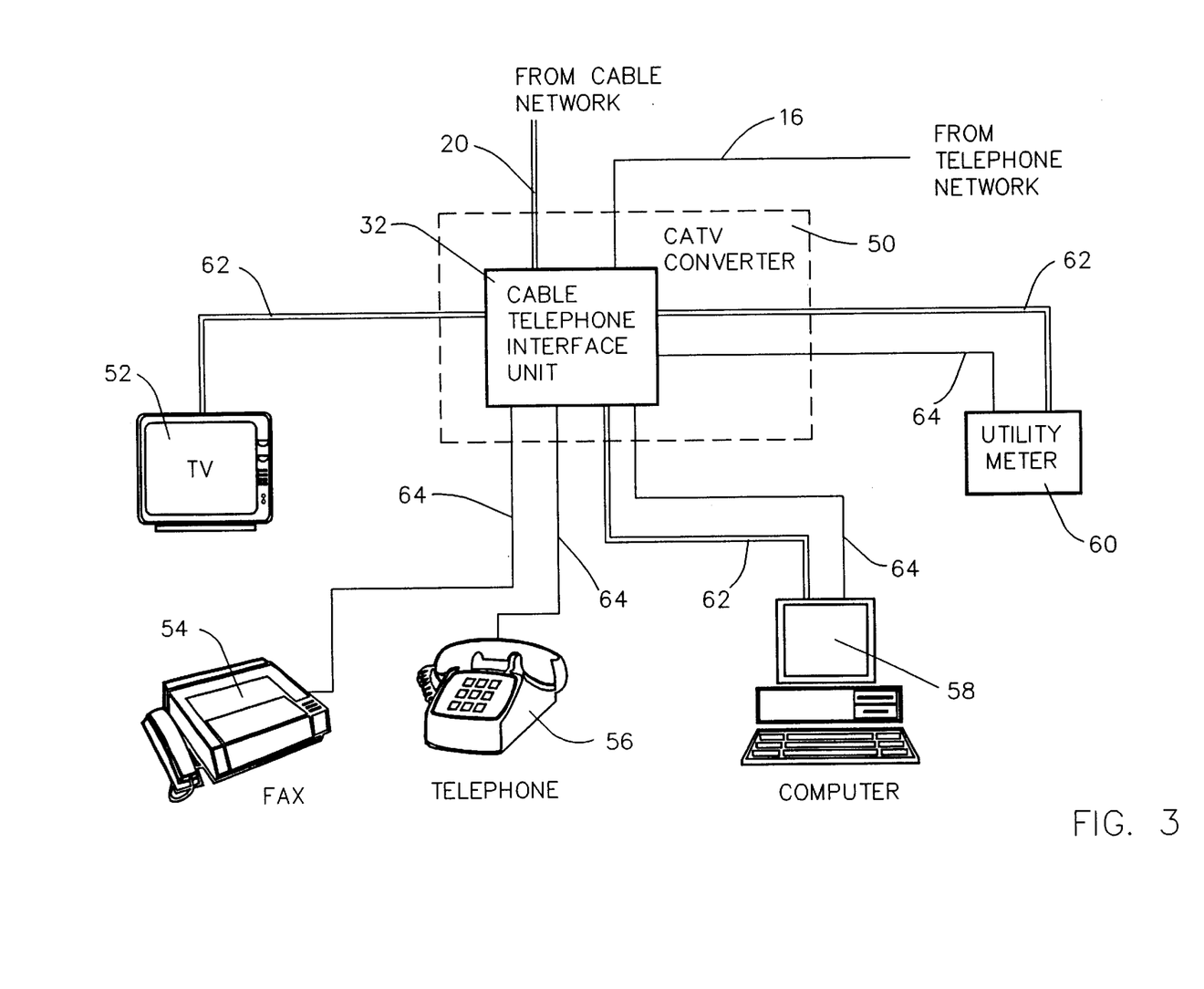
FIG. 3 is a generalized block diagram illustration of a portion of the integrated telephone and cable network system of FIG. 1 in accordance with another preferred embodiment of the invention.

Another such environment is illustrated generally in FIG. 3, wherein the subscriber interface unit is embodied in a CATV converter 50 which is coupled to the first and second network cabling 16 and 20 and is also connected to various communications appliances and devices, such as a television 52, a facsimile machine 54, a telephone 56, a computer 58 and a communicating utility meter 60. The connections to the various communications appliances and devices may be via either cable wiring 62 or telephone wiring 64, independent of the medium, i.e. first or second network cabling 16 and 20, along which the communication is carried from the subscriber location to a remote location and from the remote location to the subscriber.

Figure 4:
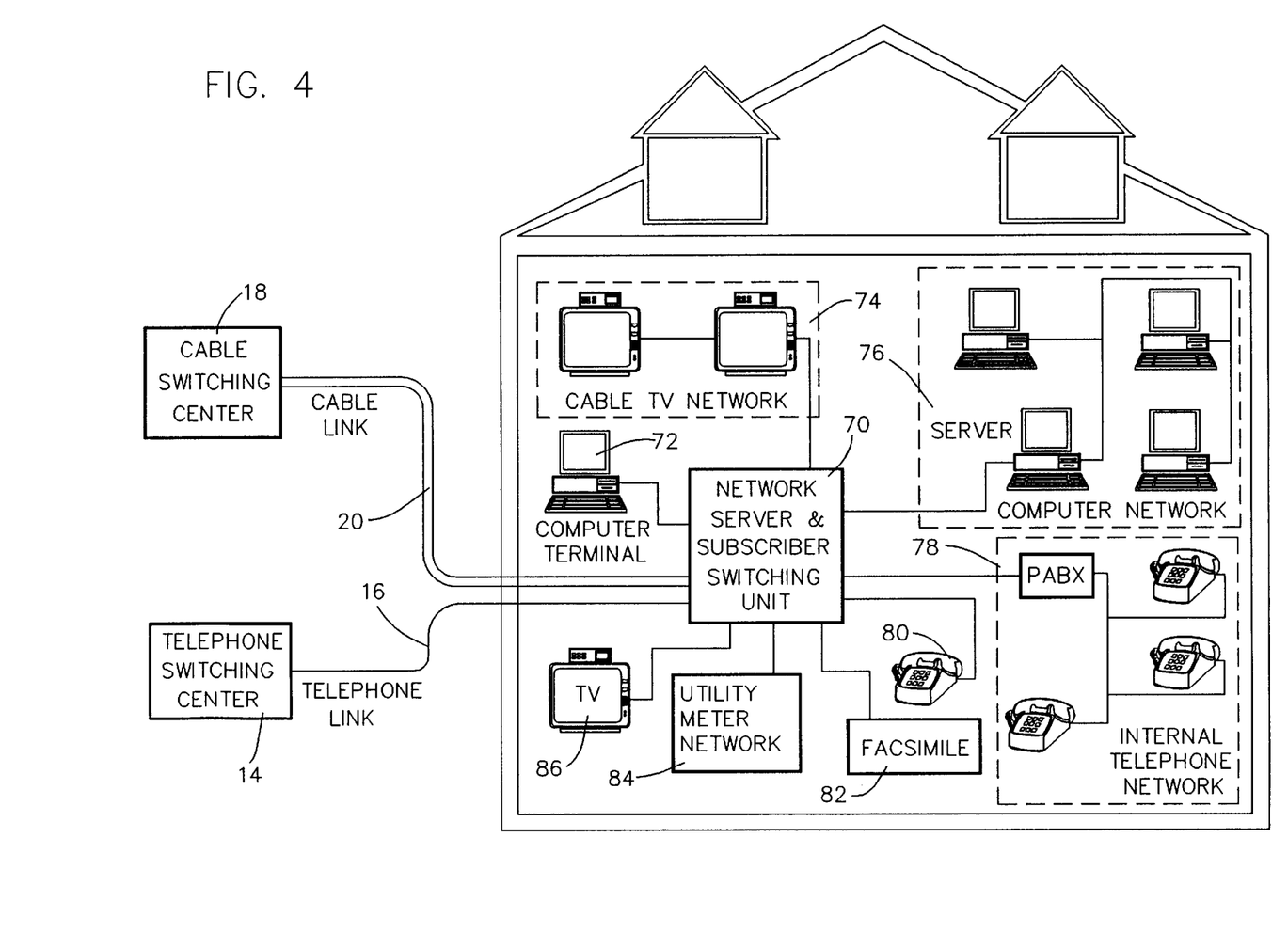
FIG. 4 is a generalized block diagram illustration of a portion of the integrated telephone and cable network system of FIG. 1 in accordance with yet another preferred embodiment of the invention.

A further such environment is illustrated generally in FIG. 4, wherein the subscriber interface unit is embodied in a network server and subscriber switching unit 70 which is coupled to the first and second network cabling 16 and 20 and is also connected to various communications networks, appliances and devices, such as a computer terminal 72, a local cable TV network 74, a local computer network 76, a PABX based internal telephone network 78, an individual telephone 80, a facsimile machine 82, a a communicating utility meter or network 84, and a television 86.

The connections to the various communications appliances and devices may be via either cable wiring or telephone wiring, independent of the medium, i.e. first or second network cabling 16 and 20, along which the communication is carried from the subscriber location to a remote location and from the remote location to the subscriber.

The subscriber unit may thus be seen to be operative for interfacing between a subscriber telephone facility and a subscriber cable facility on one side and first and second network cabling connected respectively to a telephone network and a cable network on the other hand and to include apparatus for providing communication between the subscriber telephone facility and the second network cabling and between the subscriber cable facility and the first network cabling.

In accordance with a preferred embodiment of the present invention the subscriber interface unit includes directing apparatus for directing information between the first subscriber cabling on one side and either of the first and second network cabling on the other side.

Further in accordance with a preferred embodiment of the present invention the subscriber interface unit includes directing apparatus for directing information between the second subscriber cabling on one side and either of the first and second network cabling on the other side.

Additionally in accordance with a preferred embodiment of the present invention the subscriber interface unit includes directing apparatus for directing information between the first network cabling on one side and either of the first and second subscriber facilities on the other side.

Still further in accordance with a preferred embodiment of the present invention the subscriber interface unit includes directing apparatus for directing information between the second network cabling on one side and either of the first and second subscriber facilities on the other side.

Additionally in accordance with a preferred embodiment of the present invention the subscriber interface unit includes apparatus for automatic load directing between the first and second network cabling.

Further in accordance with a preferred embodiment of the present invention, the subscriber interface unit includes reformatting apparatus for changing information from a cable network format to a telephone network format.

Additionally in accordance with a preferred embodiment of the present invention, the subscriber interface unit includes reformatting apparatus for changing information from a telephone network format to a cable network format.

Figure 5:
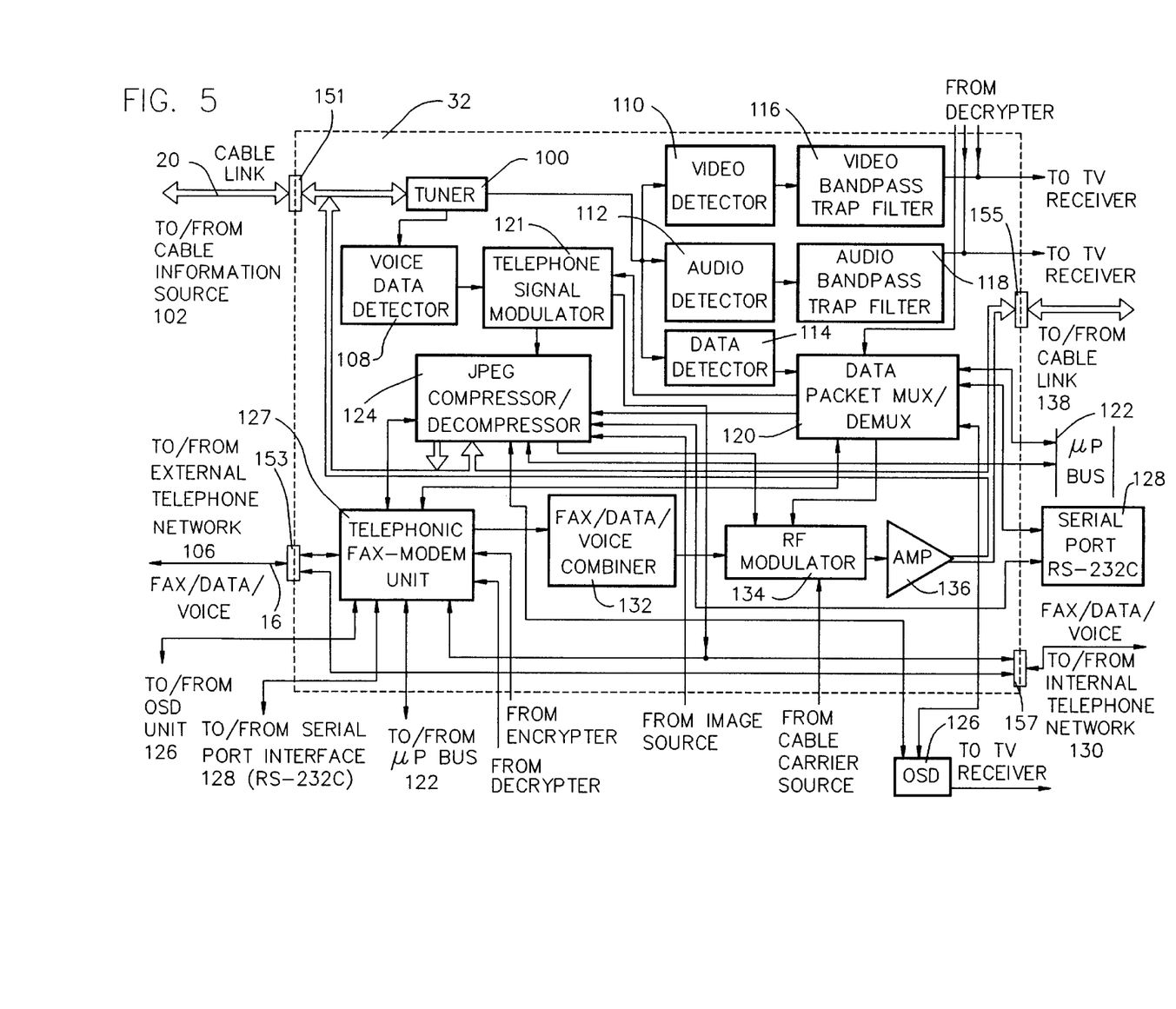
FIG. 5 is a generalized block diagram of circuitry useful in the apparatus of FIGS. 1–4 which is constructed in accordance with one embodiment of the present invention.

The foregoing features are provided in a preferred embodiment of a subscriber interface unit which is illustrated in FIG. 5. Subscriber interface unit 32 comprises a tuner 100 which receives video, audio, and data from a cable information source which forms part of an external cable network 102 via cabling 20 and communication port 151. The data received may include graphics, pictures, facsimile, E-mail, voice-mail, speech in the form of telephone conversations and all types of digital computer generated data.

The cable source may be, for example, a cable transmitting facility or a satellite communication source.

The tuner 100 preferably includes all circuitry required for receiving, tuning, filtering and amplification of the signal supplied by the cable source. The signal is then detected and separated by one or more of the following detectors: a voice data detector 108, a video detector 110, an audio detector 112 and a data detector 114.

The output of the voice data detector 108 is provided to a telephone signal modulator 121 which is operative to transmit voice signals received along external cable link 20 directly to an internal telephone network 130.

The output of video detector 110, typically in the form of a composite video baseband signal, is provided to a video bandpass trap filter 116, which provides a "clean" composite video baseband signal to an external television (TV) or a multimedia output device or network where it may be displayed, stored or edited.

The output of audio detector 112, in the form of an audio signal, is provided to an audio bandpass trap filter 118 which provides a "clean" audio signal to an external television (TV) receiver, audio output device or entertainment system or network where it may be played, stored or edited.

The data output from data detector 114 is provided to a data packet multiplexer/demultiplexer (mux/demux) 120 which directs the data according to its destination.

Data packet mux/demux 120 preferably communicates via a micro-processor bus 122 for transmission of data which is to be displayed on a computer terminal such as terminal 72 (FIG. 4). Alternatively or additionally bus 122 may be a mini-computer bus or any other computer communication bus. In a preferred embodiment of the invention bus 122 is the communication bus of a personal computer such as the AT-Bus or the EISA Bus.

Compressed images received via mux/demux 120 or from an external image source (not shown) are provided to a JPEG or other suitable compressor/decompressor unit 124 where they are decompressed and transmitted to the micro-processor bus 122, if they are to be displayed on a computer monitor, or to an onscreen-display (OSD) unit 126 which prepares the images for display on a TV screen.

It is to be appreciated that the compressor/decompressor unit 124 may be a unit which is separate and apart from the remainder of the subscriber interface unit 32. In such a case, subscriber interface unit 32 communicates with compressor/decompressor unit 124 whenever compression or decompression is required.

OSD unit 126 may receive uncompressed image data directly from mux/demux 120. Data received via mux/demux 120 may also be fed directly or via the compressor/decompressor unit 124 to a serial port interface 128, such as an RS-232C, which can communicate with terminals, modems and external storage devices.

In a preferred embodiment of the present invention mux/demux 120 may also output directly to the telephone signal modulator 121 which is operative to transmit voice signals received along external cable link 20 directly to the internal telephone network 130.

If the data from the data packet mux/demux 120 is to be further communicated over telephone links, or to telephonic interfaces, data packet mux/demux 120 outputs it to a telephonic fax-modem or modem unit 127. Telephonic fax-modem unit 127 prepares the data in a suitable format for transmission as facsimile or plain data over telephone links, decompresses it if it was compressed, for example in facsimile communication, and preforms the required modulation operations if the data is to be transmitted to telephone networks. Fax-modem unit 127 then provides it to one or more of the following: an internal telephone network 130 via a communication port 157, serial port interface 128 and micro-processor bus 122.

It is to be appreciated that the telephonic fax-modem unit 127 may be a unit which is separate and apart from the remainder of the subscriber interface unit 32. In such a case, subscriber interface unit 32 includes an additional communication port (not shown) which is connected to a port of the telephonic fax-modem unit 127 by a communication cable (not shown).

The subscriber interface unit 32 also receives information via an external telephone network 106 and a communication port 153. The speech and non-data information received from the external network is transmitted directly to internal telephone network 130. Facsimile data and plain data received from the external telephone network 106 is supplied to the telephonic fax-modem unit 127. Fax modem unit 127 is operative to supply information received via the external telephone network 106 to a fax/data/voice combiner 132. The output of combiner 132 is supplied to an RF modulator 134 which receives a carrier input from a cable carrier source (not shown) and outputs via an amplifier 136 to an internal cable link 138 via communication port 155.

Fax modem unit 127 is also operative to interface with OSD unit 126 to enable information received via the external telephone network 106 to be displayed on a television receiver. Alternatively or additionally fax modem unit 127 may receive information from the OSD unit 126 and transmit that information to internal telephone network 130.

Fax modem unit 127 is additionally operative to interface with serial port interface 128 such as an RS-232C and with micro-processor bus 122 for transmitting computer generated data over cable or telephone links.

Additionally in accordance with a preferred embodiment of the present invention, fax modem unit 127 may interface with an encryptor and a decrypter (not shown) for providing encrypted communications.

The functionality of the subscriber interface unit 32 for communications received via an external cable link 20 and via an external telephone link 16 has been described hereinabove. It is also a particular feature of the present invention that the subscriber interface unit 32 is operative for directing communications received via internal cable link 138 and via an internal telephone network 130 to either the cable information source 102 or the external telephone network 106. The apparatus carrying out these functionalities will now be described:

The subscriber interface unit 32 also receives information via internal cable link 138 and via compressor/decompressor 124 to the extent that compression or decompression is required and thence directly to external cable link 20. Alternatively or additionally this information may also be fed to a television receiver via the above-described information pathway beginning with tuner 100 in the same way as information received via cable link 20 passes. It is to be appreciated that data may be directed via mux/demux 120 and fax modem unit 127 to either external telephone network 106 or internal telephone network 130, as described hereinabove.

The subscriber interface unit 32 additionally receives information from internal telephone network 130 and transmits voice and non-data information directly to the external telephone network 106. Additionally, data is transmitted via fax modem unit 127 directly to the external telephone network 106 or via combiner 132 and modulator 134 to either internal cable link 138 or external cable link 20. Compression and decompression as necessary is provided by compressor/decompressor 124.

The apparatus of FIG. 5 is particularly suited for use with analog video and audio signals and digital information carried thereby.

Figure 6:
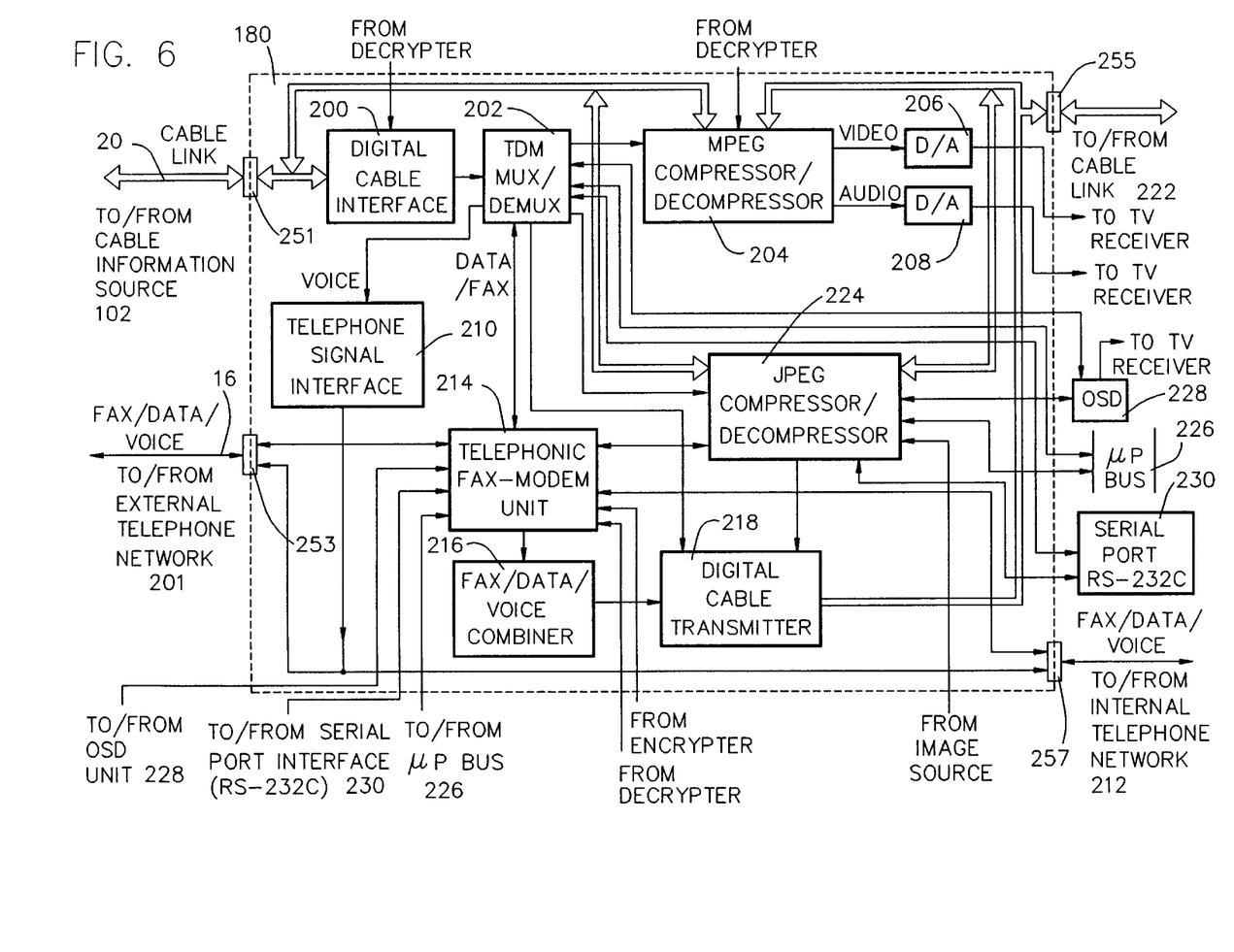
FIG. 6 is a generalized block diagram of circuitry useful in the apparatus of FIGS. 1–4 which is constructed in accordance with another embodiment of the present invention.

Reference is now made to FIG. 6, which illustrates a subscriber interface unit 180 which is particularly suited for use with purely digital signals which include inter alia digital video and digital audio information as well as data.

The subscriber interface unit 180 comprises a digital cable interface 200, such as a QPSK modulator/demodulator, which receives digital information from cable information source, which forms part of an external cable network 102 via a communication port 251 and via external cable link 20. The output of digital cable interface 200 is supplied to a digital multiplexer/demultiplexer (mux/demux) 202, preferably a TDM multiplexer/demultiplexer, which separates the information into voice, video, audio and data information. The video and audio information is supplied to compressor/decompressor 204, preferably an MPEG compressor/decompressor, which provides all necessary compression and decompression and outputs video information via a digital to analog (D/A) converter 206 and which outputs audio information via a D/A converter 208 to a television receiver (not shown).

The voice information is supplied to a telephone signal interface unit 210, which converts the digital data to an analog voice signal suitable for transmission over telephone links and provides it to either of internal telephone network 212 or to external telephone link 16.

Facsimile information in conventional facsimile format and some other data information is supplied to a fax modem unit 214, which may be identical to fax modem unit 127 (FIG. 5). The fax modem unit 214 outputs via a fax/data/voice combiner 216 and a digital cable transmitter unit 218, which prepares the digital data in a format suitable for transmission over digital cable links. Digital cable transmitter 218 may also receive data information directly from mux/demux 202. The output of digital cable transmitter 218 is supplied to cable link 222 via a communication port 255.

Compressed data is supplied by mux/demux 202 to a compressor/decompressor 224, such as a JPEG compressor/decompressor. Compressor/decompressor 224 may be identical to compressor/decompressor 124 (FIG. 5) and is operative to decompress and transmit the data to a microprocessor bus 226, if it is to be displayed on a computer monitor, or to an on-screen-display (OSD) unit 228 which prepares images for display on a TV screen. The OSD unit 228 may also receive uncompressed image data directly from mux/demux 202. Data received via mux/demux 202 may also be fed directly or via the compressor/decompressor unit 224 to a serial port interface 230, such as an RS-232C, which can typically communicate with modems and terminals. The output of compressor/decompressor 224 may also be supplied via digital cable transmitter 218 to cable link 222. Compressor/decompressor unit 224 may be also operable to receive images from an image source (not shown).

The subscriber interface unit 180 also receives information via an external telephone network 201 and a communication port 253 and transmits speech and non-data information directly to internal telephone network 212. Fax modem unit 214 is also operative to transmit information received via the external telephone network to fax/data/voice combiner 216. The output of combiner 216 is supplied via digital cable transmitter 218 and via a communication port 255 to internal cable link 222.

Fax modem unit 214 is also operative to interface with OSD unit 228 to enable information received via the external telephone network to be displayed on a television receiver. Alternatively or additionally fax modem unit 214 may receive information from the OSD unit 228 and transmit that information to internal telephone network 212 via a communication port 257, such as for videophone applications.

Fax modem unit 214 is additionally operative to interface with serial port interface 230 and with microprocessor bus 226 for transmitting computer generated data over cable or telephone links.

Additionally in accordance with a preferred embodiment of the present invention, fax modem unit 214 may interface with an encryptor and a decrypter (not shown) for providing encrypted communications.

The functionality of the subscriber interface unit 180 of FIG. 6 for communications received via an external cable link 20 and via an external telephone link 16 has been described hereinabove. It is also a particular feature of the present invention that the subscriber interface unit 180 is operative for directing communications received via internal cable link 138 and via an internal telephone network 130 to either the external cable network 102 or the external telephone network 201. The apparatus carrying out these functionalities will now be described:

The subscriber interface unit 180 also receives information from internal cable link 222 via compressor/decompressor 204 or compressor/decompressor 224 to the extent that compression or decompression is required and thence directly to external cable link 20. Alternatively or additionally this information may also be fed to a television receiver via the above-described information pathway beginning with digital cable interface 200 in the same way as information received via cable link 20.

It is to be appreciated that the compressor/decompressor units 204 and 224 may be units which are separate and apart from the remainder of the subscriber interface unit 180. In such a case, subscriber interface unit 180 communicates with compressor/decompressor units 204 and 224 whenever compression or decompression is required.

Data may be also directed via mux/demux 202 and fax modem unit 214 to either external telephone network 201 or internal telephone network 212, as described hereinabove.

The subscriber interface unit 180 additionally receives information from internal telephone network 212 and transmits voice information directly to the external telephone network 201. Additionally, data is transmitted via fax modem unit 214 directly to the external telephone network 201 or via combiner 216 and modulator 218 to either internal cable link 222 or external cable link 20. Compression and decompression as necessary is provided by compressor/decompressor 204 or compressor/decompressor 224.

It is to be appreciated that if the cabling is similar for the telephone and cable networks, for example in the case that all cabling is fiber optic cabling, then the conversion from telephone to cable and vice versa is much simpler and part of the units described in FIGS. 5 and 6 may be simplified or even eliminated. For example, digital cable interface 200 and digital cable transmitter 218 may become an interface unit which performs both interface and transmission operations.

Figure 7:
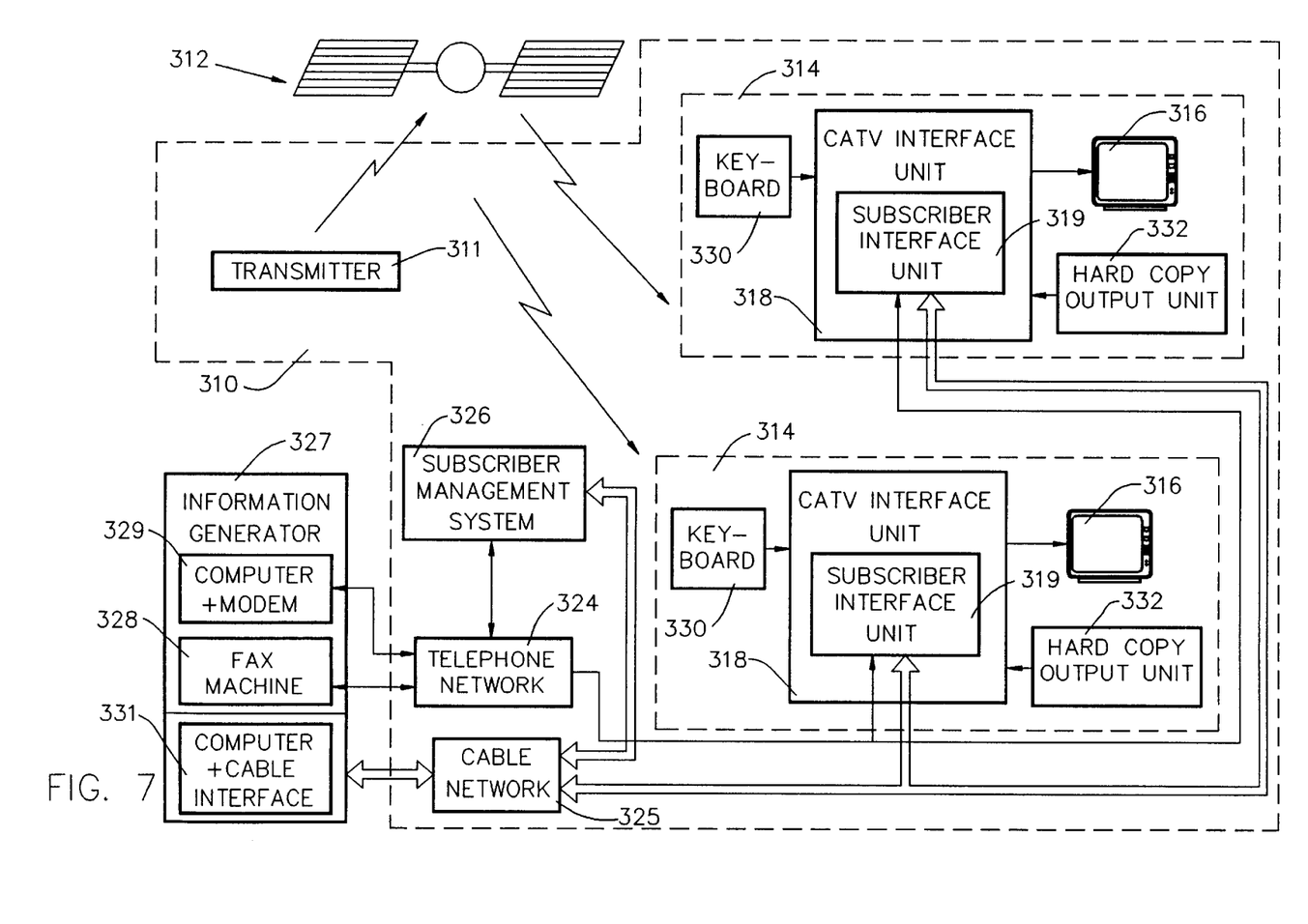
FIG. 7 is a generalized block diagram of a CATV system employing at least part of the system of FIGS. 1–6.

Reference is now made to FIG. 7, which is a generalized block diagram illustration of a CATV system constructed and operative in accordance with another preferred embodiment of the present invention and employing at least part of the systems of FIGS. 1–6.

The CATV system includes or is used with a CATV network 310 which is typically a combination telephone—radio frequency (RF) network. The network employs RF links, such as cable links 20 (FIG. 1) which may be connected to a headend via trunk cables, wireless radio communications and/or satellite communications for transmitting information to subscribers and employs an existing telephone network, such as network 10 having telephone links 16 (FIG. 1) for receiving information from subscribers. Alternatively the transmission to the subscriber may be via a telephone link and the transmission from the subscriber may be via a cable, wireless or satellite link. According to further alternatives, communication in both directions may be by telephone or by cable, wireless or satellite link.

The CATV network preferably comprises a program transmitter 311 coupled through a satellite communication link 312 with a multiplicity of subscriber units 314. Alternatively, communication link 312 may be either a cable or a fiber-optic communication link.

Preferably, each of the multiplicity of subscriber units includes a television 316, a CATV interface unit 318 preferably having associated therewith a subscriber interface unit 319 such as subscriber interface units 32 (FIG. 5) and 180 (FIG. 6).

The CATV interface unit 318 may include a conventional CATV converter which is commercially available from multiple vendors.

CATV interface units 318 may be connected, via subscriber interface unit 319, to a standard telephone network 324 and to a cable network 325 for voice, data and fax communications. It is to be appreciated that cable network 325 may be a satellite communication network including a satellite link such as satellite link 312.

Conventional CATV data such as authorizations and program viewing data is communicated to and from a subscriber management system 326 via either the telephone network 324 or the cable network 325. Facsimile, E-mail, voice-mail and mail data may be provided to the subscriber units 314 via the CATV network from an information generator 327, such as a standard fax machine 328, a computer and associated modem 329 and a computer and associated cable interface 331.

In a preferred embodiment of the invention the CATV interface unit 318 may be also associated with a keyboard 330 to produce faxes to be sent to any of fax machines, internal fax-modem cards and cable interface cards forming part of computer systems via the CATV network.

Figure 8:
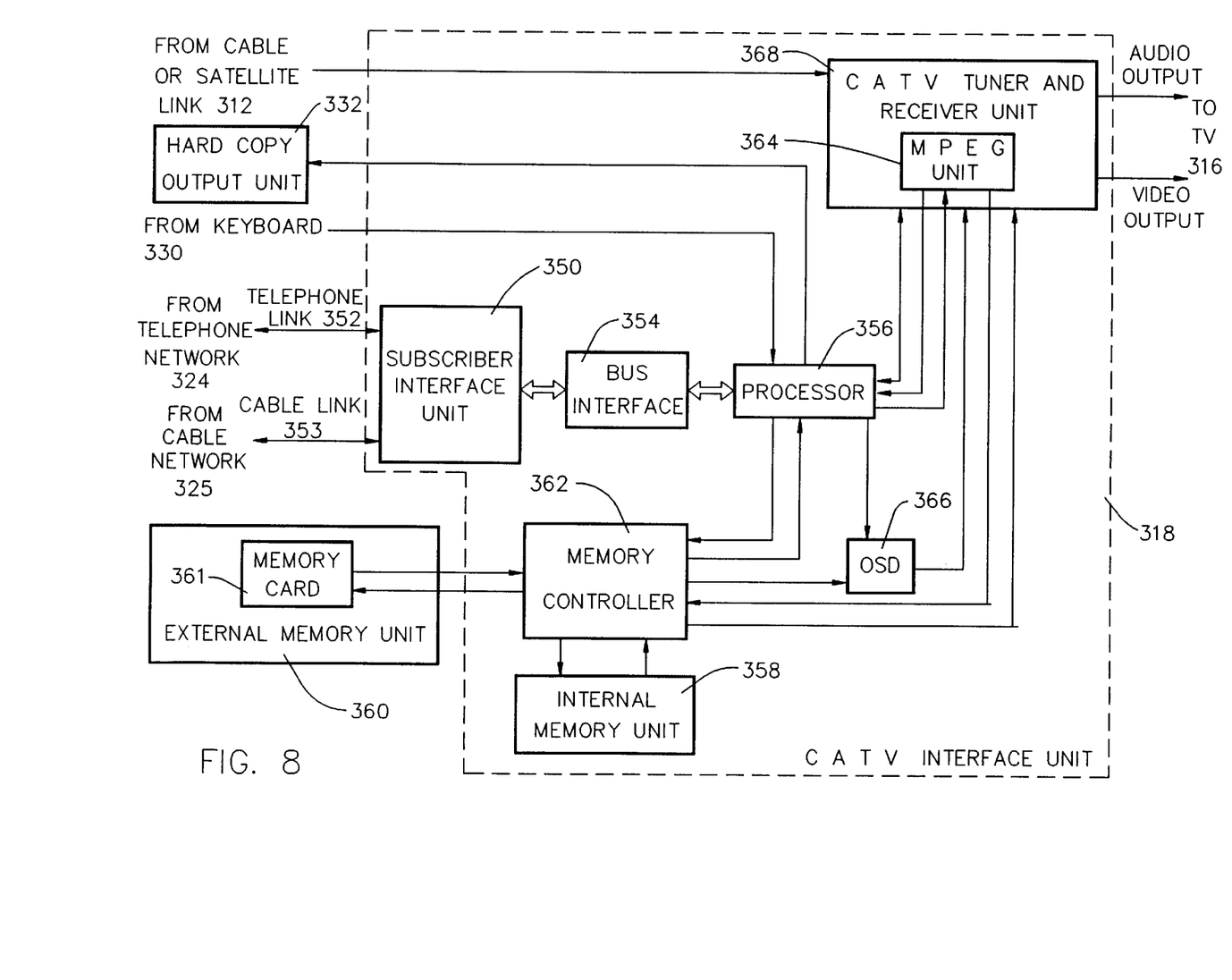
FIG. 8 is a block diagram of circuitry useful in the apparatus of FIG. 7.

Reference is now made to FIG. 8 which is a generalized block diagram illustration of CATV interface unit 318 which forms part of subscriber unit 314.

CATV interface unit 318 receives facsimile and other data and voice as well as communication management data from telephone network 324 (FIG. 7), forming part of CATV network 310, via a receive-transmit subscriber interface unit 350 such as unit 32 or unit 180 as described hereinabove with reference to FIGS. 5 and 6 respectively via a standard telephone link 352. CATV interface unit 318 also receives facsimile and other data and voice as well as communication management data from a cable network 325 via a conventional coaxial cable or fiber optic link 353.

Unit 350 provides data to a processor 356 via a communication bus interface 354. Processor 356 provides facsimile data and other data as well as voice to either of an internal memory unit 358 or an external memory module 360 via a memory controller 362. Preferably, external memory unit 360 includes a memory card 361 and a memory card reader (not shown).

In a preferred embodiment of the invention processor 356 also receives data input by a subscriber via keyboard 330 (FIG. 7) and prepares it in a suitable format for transmission as fax, E-mail or mail data via telephone link 352 or cable link 353. Processor 356 may also provide fax data, E-mail data, voice-mail data and mail data to hard copy output unit 332 for printout.

In many cases unit 350 already includes a compression/decompression standard unit for facsimile transmission and reception. If the fax data is not compressed at unit 350 it may be necessary to compress it before storage in the memory. In that case a compression/decompression unit which is used for conventional CATV digital video and audio transmissions may be employed, so that processor 356 provides the fax, E-mail, voice-mail and mail data to either of internal memory unit 358 or external memory module 360 via compression/decompression unit 364, preferably in the MPEG format, and via memory controller 362.

Stored faxes, E-mail, voice-mail and other data are provided by either of the memories 358 or 360 to processor 356 via memory controller 362 and, in the case that the data was previously compressed by compression/decompression unit 364, via unit 364. The stored data is then provided to an on-screen-display (OSD) unit 366. OSD unit 366 prepares the fax data, the E-mail data, the voice-mail data and other data in a format suitable for reception by a TV receiver and provides it to CATV tuner and receiver unit 368. In a preferred embodiment of the invention OSD unit 366 may be part of the CATV tuner and receiver unit 368.

CATV tuner and receiver unit 368 also receives encrypted video and audio program transmissions from communication link 312 and provides decrypted video and audio data to TV 316. CATV tuner and receiver unit 368 is operable upon authorizations received from subscriber management system 326 which may be received either via satellite or via any of telephone link 352 and cable link 353 and processed in processor 356 or in CATV tuner and receiver unit 368.

Upon tuning the television receiver to an information display channel, such as a fax display channel or upon selection of a non-CATV data display option on a CATV remote control unit when the television receiver is tuned to any channel, CATV tuner and receiver unit 368 displays on the television receiver menus of potential data selections. Upon selection of a preferred menu, images of stored information, such as faxes, together with audio from communication link 312 or voice-mail, which accompanies the received information are displayed on the TV receiver 316. The audio from link 312 may alternatively be any suitable background music.

At any time, prior to, during or after display of the information on the TV, a hard copy thereof may be provided by hard copy output device 332.

It is to be appreciated that the system of the present invention may be also employed in a videophone system in which the images of the people involved in a telephone conversation are displayed on the television screen. When a connection is made the telephone number and the image of the person originating the call are displayed on the television screen of the recipient, preferably at a corner of the television screen. Thus, the video telephone conversation may take place simultaneously with a video program display.

The combined telephone and cable network of the present invention also enables switching of information between the cable network and the telephone network in case one of the networks is overloaded. In such a case functions such as meter reading over communication networks can be constantly maintained by routing communication from telephone to cable and vice versa.

It will be appreciated by persons skilled in the art that the present invention is not limited by what has been particularly shown and described hereinabove. Rather the scope of the present invention is defined only by the claims which follow:

We claim:
1. A subscriber interface unit comprising:
a cable signal receiver and tuner for receiving and tuning a first cable signal wherein said cable signal comprises at least one of a video signal, an audio signal, a voice signal and a data signal;
video and audio converters for converting at least part of said video signal and said audio signal to a format suitable for receiving at a television receiver and for supplying the converted video signal and the converted audio signal to said television receiver;
a voice converter for converting at least part of said voice signal to a format suitable for transmission over a telephone link and for supplying the converted voice signal to at least part of a telephone network;
a data converter for converting at least part of said data signal to a format suitable for transmission over either of a cable link or said telephone link and for supplying the converted data signal to at least one of said cable link and said telephone link;
a cable signal transmitter for transmitting a second cable signal over said cable link; and
a telephone signal converter, wherein a telephone signal, which comprises at least one of a video signal, an audio signal, a voice signal, a facsimile signal, and a data signal, is converted to a signal suitable for transmission on either of said cable link or said telephone link.

2. A subscriber interface unit according to claim 1 and wherein at least one of said video signal and said audio signal is an analog signal and the corresponding converter is an analog signal converter.

3. A subscriber interface unit according to claim 1 and wherein at least one of said video siqnal and said audio signal is a digital signal and the corresponding converter is a digital signal converter.

4. A subscriber interface unit according to claim 1 and further comprising a compressor/decompressor for compressing/decompressing at least part of at least one of said first cable signal, said second cable signal, and said telephone signal.

5. A subscriber interface unit according to claim 4 and wherein said compressor/decompressor is coupled to at least one of a micro-processor bus, a serial port and an image source, and is operative to compress/decompress information provided by said at least one of a micro-processor bus, a serial port and an image source.

6. A subscriber interface unit according to claim 4 and wherein at least one of said video signal and said audio signal comprises a digital signal, the corresponding converter comprises a digital signal converter, and said compressor/decompressor includes at least one of a JPEG compressor/decompressor and an MPEG compressor/decompressor.

7. A subscriber interface unit according to claim 6 and further comprising an encryptor/decrypter for encrypting/decrypting at least part of at least one of said first cable signal, said second cable signal, and said telephone signal.

8. A subscriber interface unit according to claim 4 and further comprising an encryptor/decrypter for encrypting/decrypting at least part of at least one of said first cable signal, said second cable signal, and said telephone signal.

9. A subscriber interface unit according to claim 1 and further comprising an encrypter/decrypter for encrypting/decrypting at least part of at least one of said first cable signal, said second cable signal, and said telephone signal.

10. Apparatus according to claim 1 wherein at least one of said converted data signal and the data signal comprised in said telephone signal is supplied to any of a microprocessor bus, a serial port and an on-screen-display unit.

11. Apparatus according to claim 1 wherein at least one of said converted data signal and the data signal comprised in said telephone signal is received from any of a microprocessor bus, a serial port and an on-screen-display unit.

12. Apparatus according to claim 1 wherein said first cable signal is received from an image source.

13. Apparatus according to claim 1 wherein said second cable signal is supplied to an image source.

14. Apparatus according to claim 1 wherein said telephone signal is provided via said telephone network.

15. Apparatus according to claim 1 wherein the data signal comprised in said first cable signal includes at least one of the following: a facsimile signal; a utility meter signal; and a computer signal.

16. Apparatus according to claim 1 wherein the data signal comprised in said telephone signal includes at least one of a utility meter signal and a computer signal.

17. Apparatus according to claim 1 and comprising first reformatting apparatus for changing information from a cable network format to a telephone network format.

18. Apparatus according to claim 17 and comprising second reformatting apparatus for changing information from said cable network format to said telephone network format.

19. Apparatus according to claim 1 and comprising reformatting apparatus for changing information from a cable network format to a telephone network format.

20. Apparatus according to claim 1 wherein said telephone link comprises twisted pair cabling.

21. Apparatus according to claim 1 wherein said cable link comprises coaxial cabling.

22. A communication network comprising:
a cable network;
a telephone network; and
the subscriber interface unit of claim 1 wherein:
said cable link is coupled to said cable network; and
said telephone link is coupled to said telephone network.

23. A communication network according to claim 22 and also comprising an internal communication network, wherein the subscriber interface unit is also coupled to said internal communication network.

24. A communication network according to claim 23 and wherein said internal communication network comprises at least one of a television, a telephone, a facsimile machine, a computer and a utility meter.

25. A communication network according to claim 23 wherein said internal communication network comprises at least one of a local-area-network, a wide-area-network and a personal-area-network.

26. A communication network according to claim 22 wherein the subscriber interface unit is operative to receive said first cable signal from said cable network via said cable link, and to transmit said second cable signal to said cable network via said cable link.

27. A communication network according to claim 22 wherein the subscriber interface unit is operative to receive said telephone signal from said telephone network via said telephone link, and to transmit said converted voice signal and said converted data signal to said telephone network via said telephone link.

28. A communication network according to claim 22 wherein:
said cable network includes a cable switching center; and
said telephone network includes a telephone switching center.

29. A communication network according to claim 22 and comprising a communication appliance which is coupled to said subscriber interface unit.

30. A communication network according to claim 29 wherein said subscriber interface unit is housed in said communication appliance.

31. A communication network according to claim 29 wherein said communication appliance comprises at least one of the following: a television; a telephone; a facsimile machine; a computer; a television; a CATV converter; and a utility meter.

32. A communication interfacing method comprising:
receiving and tuning a first cable signal wherein said first cable signal comprises at least one of a video signal, an audio signal, a voice signal and a data signal;
converting, in video and audio converters, at least part of said video signal and said audio signal to a format suitable for receiving at a television receiver;
supplying the converted video signal and the converted audio signal to said television receiver;
converting, in a voice converter, at least part of said voice signal to a format suitable for transmission over a telephone link;
supplying the converted voice signal to at least part of a telephone network;
converting, in a data converter, at least part of said data signal to a format suitable for transmission over either of a cable link or said telephone link;
supplying the converted data signal to at least one of said cable link and said telephone link;
transmitting a second cable signal over said cable link; and
converting, in a telephone signal converter, a telephone signal, which comprises at least one of a video signal, an audio signal, a voice signal, a facsimile signal, and a data signal to a signal suitable for transmission on either of said cable link and said telephone link.

33. A method according to claim 32 and comprising compressing/decompressing at least part of either of said cable signal and said telephone signal.

34. A method according to claim 32 and comprising encrypting/decrypting at least part of either of said cable signal and said telephone signal.

35. A method according to claim 32 wherein:
said step of receiving the first cable signal comprises receiving the first cable signal from a cable network; and
said step of transmitting a second cable signal comprises transmitting the second cable signal over the cable network.

36. A method according to claim 32 wherein said step of converting a telephone signal comprises the step of receiving the telephone signal from the telephone network.

* * * * *

UNITED STATES PATENT AND TRADEMARK OFFICE
CERTIFICATE OF CORRECTION

PATENT NO. : 5,774,527
DATED : June 30, 1998
INVENTOR(S) : Doron Handelman et al It is certified that error appears in the above-identified patent and that said Letters Patent is hereby corrected as shown below:

On the title page: Item

[30] August 19, 1993 Israel 106746

[60] Claims Priority of U.S. Appln. 121,349, September 15, 1993, Patent No. 5,414,773

Col. 13, line 48, delete "a television"

Signed and Sealed this

Twenty-seventh Day of April, 1999

Attest:

Q. TODD DICKINSON

*Attesting Officer*     *Acting Commissioner of Patents and Trademarks*